W. FUHR.
COUNTING MACHINE.
APPLICATION FILED DEC. 11, 1911.

1,091,207.

Patented Mar. 24, 1914.
5 SHEETS—SHEET 1.

Witnesses:
S. M. Ryan
C. J. Schmidt

Inventor:
William Fuhr
By Offield, Towle, Graves & Offield
attys

W. FUHR.
COUNTING MACHINE.
APPLICATION FILED DEC. 11, 1911.

1,091,207.

Patented Mar. 24, 1914.
5 SHEETS—SHEET 2.

Witnesses:
S. M. Ryan
C. J. Schmidt

Inventor:
William Fuhr
By Offield, Towle, Graves & Offield
Attys

W. FUHR.
COUNTING MACHINE.
APPLICATION FILED DEC. 11, 1911.

1,091,207.

Patented Mar. 24, 1914.
5 SHEETS—SHEET 3.

Witnesses:
S. M. Ryan
O. J. Schmidt

Inventor:
William Fuhr
By Offield, Towle, Graves & Offield
att's

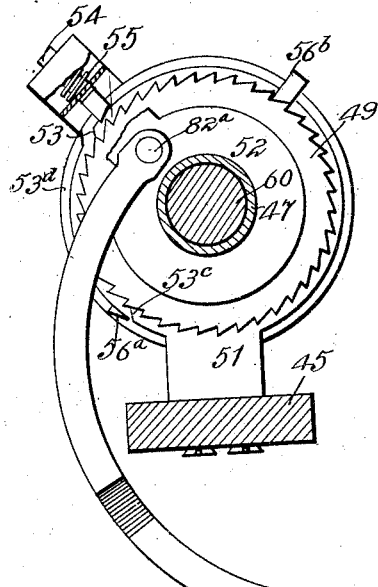
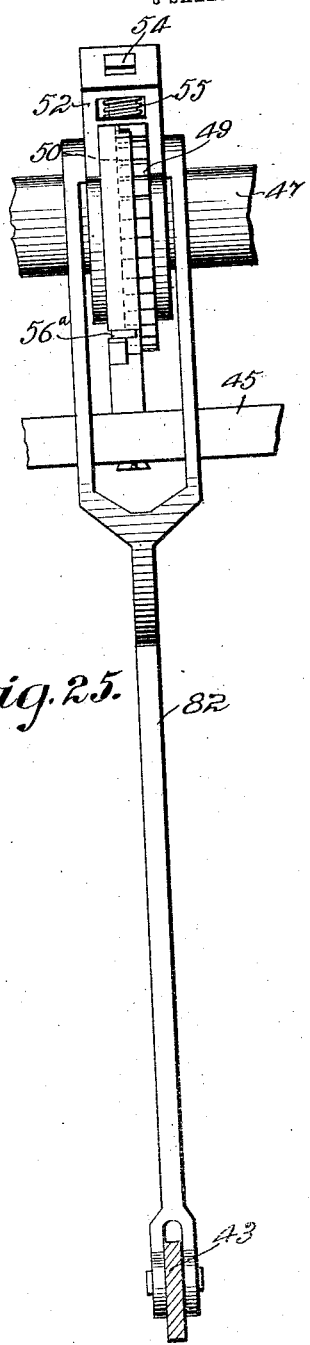
Fig. 24.
Fig. 25.

W. FUHR.
COUNTING MACHINE.
APPLICATION FILED DEC. 11, 1911.
1,091,207.
Patented Mar. 24, 1914.
5 SHEETS—SHEET 5.
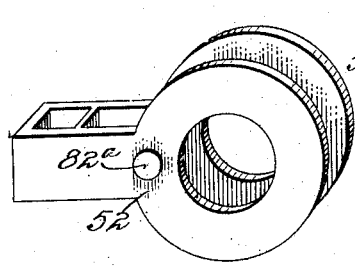
Fig. 26.
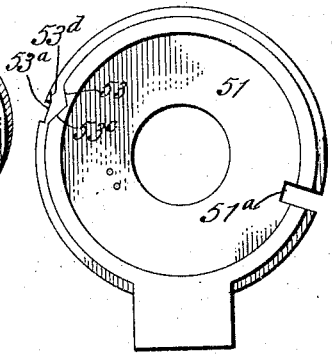
Fig. 27.
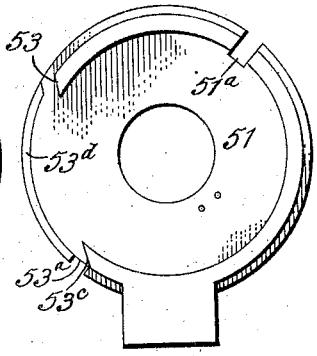
Fig. 28.
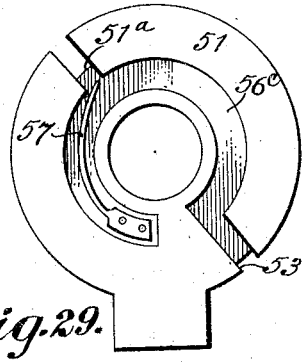
Fig. 29.
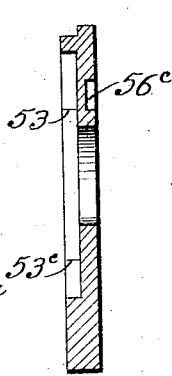
Fig. 30.
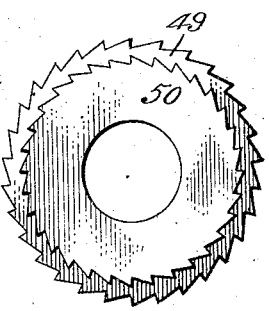
Fig. 31. Fig. 32.
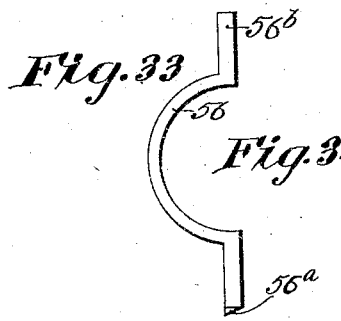
Fig. 33. Fig. 34.
Fig. 35. Fig. 36.
Witnesses:
S. M. Ryan
C. J. Schmidt.
Inventor:
William Fuhr
By Offield, Towle, Graves & Offield
attys

UNITED STATES PATENT OFFICE.

WILLIAM FUHR, OF CHICAGO, ILLINOIS.

COUNTING-MACHINE.

1,091,207.

Specification of Letters Patent.  Patented Mar. 24, 1914.

Application filed December 11, 1911.  Serial No. 665,014.

*To all whom it may concern:*

Be it known that I, WILLIAM FUHR, a citizen of the United States, residing at Chicago, in the county of Cook and State of Illinois, have invented certain new and useful Improvements in Counting-Machines, of which the following is a specification.

My invention relates to a counting machine adapted to either add numbers or subtract numbers in combination with a typewriter.

The principal object of my invention is to construct a machine that is light, rapid and simple in its operation with a small number of parts, which will be particularly adapted to manner of operation used by typewriter operators, and which at the same time will be accurate both in its operation and as to the result.

Further objects of my invention are to provide means for stopping the rings carrying the numerals at the desired point in their revolving movement and for preventing a numeral-carrying ring from moving an adjacent numeral-carrying ring except when necessary; a further advantage of my device resides in the means for shifting the mechanism so that it will subtract instead of add and vice versa, and will permit the operating of the typewriter without operating my device.

Still a further advantage resides in the means whereby the numeral-carrying rings are locked against overthrow when not in operation, and against rebound when in operation.

Further advantages of the invention will appear throughout the specification and will be more specifically pointed out in the claims.

Figure 5:
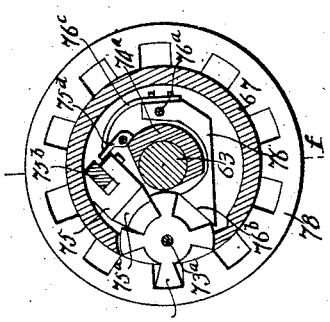
Figure 1:
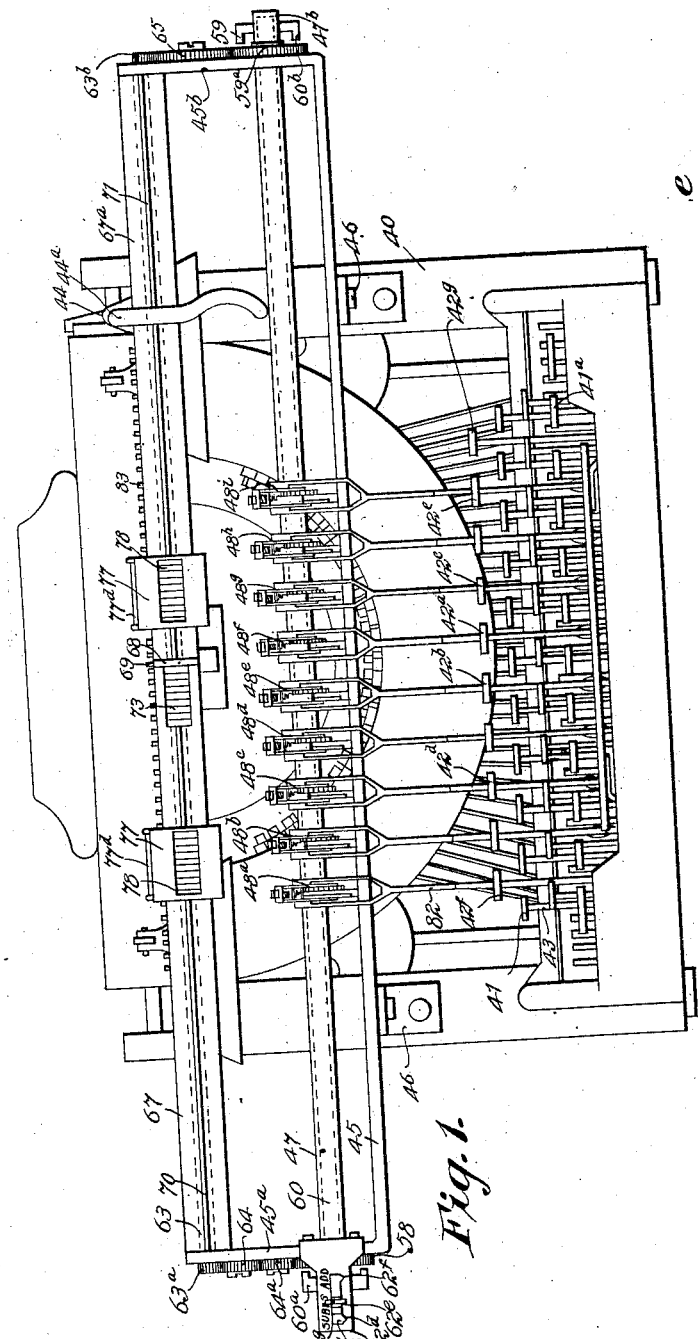
Figure 4:
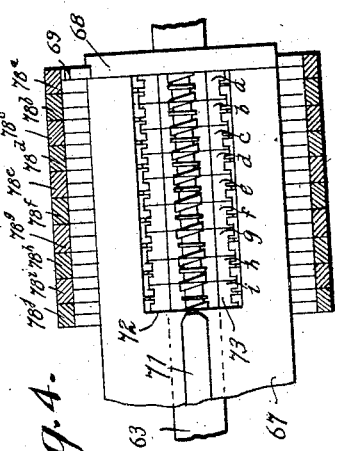
Figure 2:
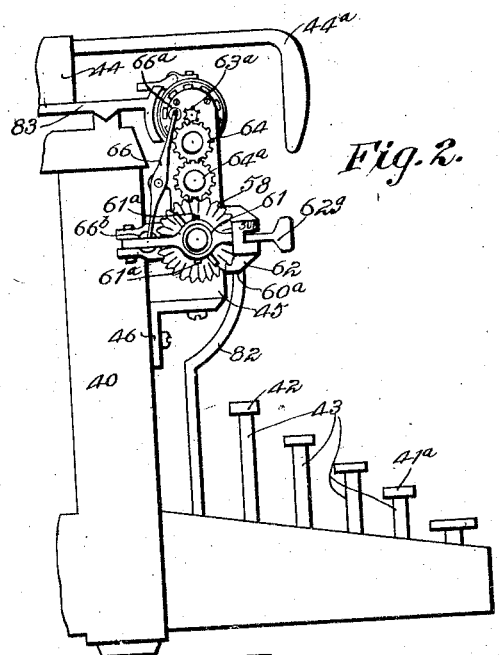
Figure 3:
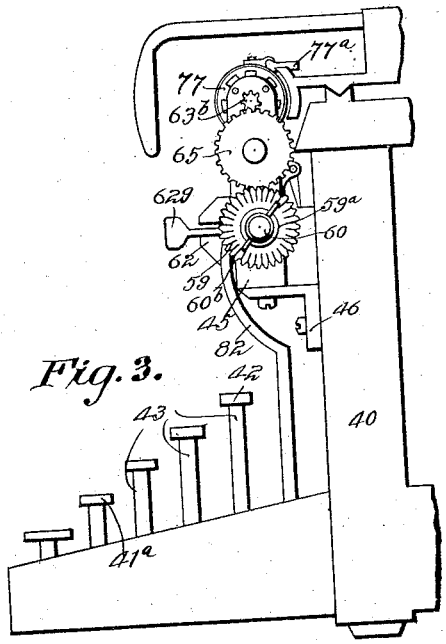
Figure 6:
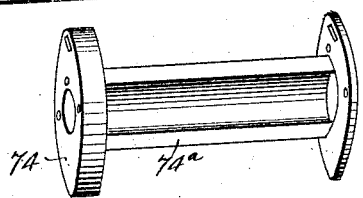
Figure 17:
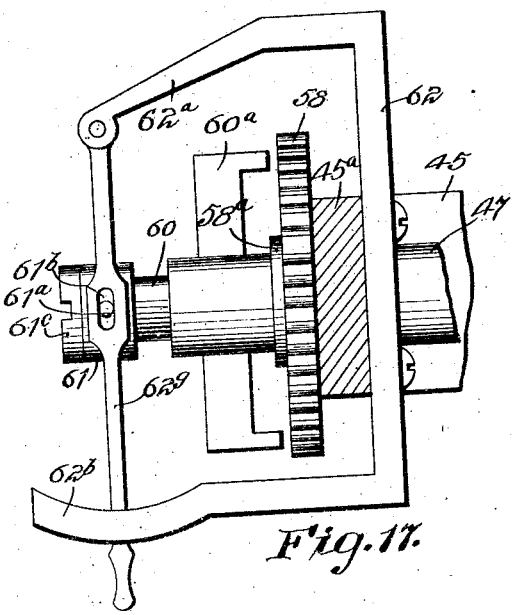
Figure 19:
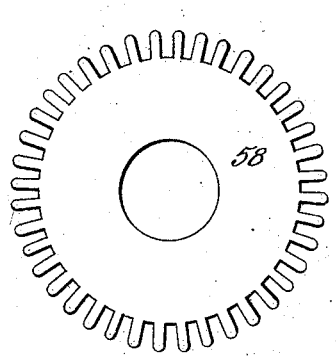
Figure 20:
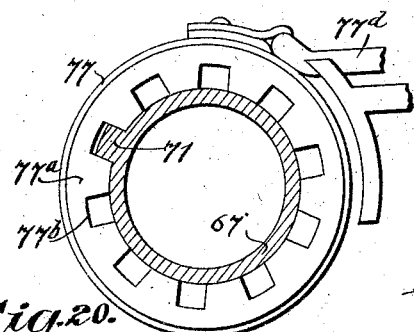
Figure 21:
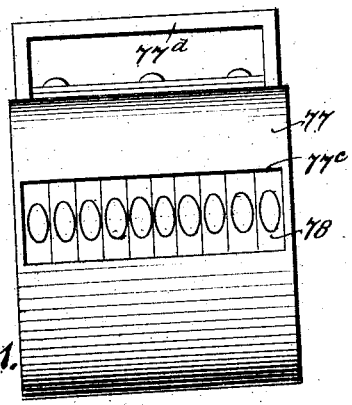
Figure 22:
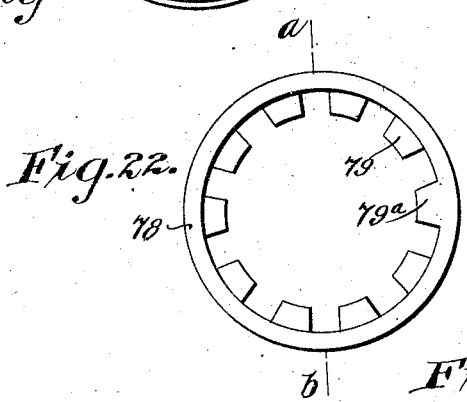
Figure 23:
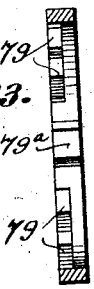
Figure 18:

In the accompanying drawings Figure 1 is a front elevational view of my improved counter attached to a typewriter; Figs. 2 and 3 are end elevational views of Fig. 1, with parts broken away; Fig. 4 is an elevational view of end of tubular guide containing carrying star wheels, with a numeral ring in cross-section. Fig. 5 is a detailed end view of Fig. 4 with part broken away, and a numeral-carrying ring in position. Figs. 6, 7, 8, 9, 10, 11, 12, 13, 14, 15 and 16 are detailed views of parts composing the mechanism for carrying and locking the numeral-carrying rings. Figs. 17, 18 and 19 are enlarged detailed views of the shifting means, end of main drive shaft, and one of the gears in said shifting means, respectively; Fig. 20 is a side elevational view of the casing inclosing the numeral-carrying rings mounted upon the numeral-carrying ring guide; the guide being shown in section. Fig. 21 is a front elevational view of the numeral-carrying casing; Fig. 22 is a plan view of one of the numeral-carrying rings; Fig. 23 is a section on the line $a$—$b$ of Fig. 22; Fig. 24 is an enlarged detailed view and side elevation of a ratchet mechanism with link connected to key rock bar of typewriter; Fig. 25 is a front elevational view of Fig. 24; Fig. 26 is a perspective view of the outside casing for the ratchet mechanism shown in Figs. 24 and 25; Figs. 27 and 28 are guard casings for the ratchet mechanism operating the numeral-carrying rings 1 and 9, respectively; Fig. 29 is a rear view of Fig. 28; Fig. 30 is a section on the line $c$—$d$ of Fig. 29; Fig. 31 is a side elevational view of the double ratchet shown in Fig. 25; Fig. 32 is an edge view of Fig. 31; Fig. 33 is a side view of the dog engaging one of the ratchets shown in Fig. 31; Fig. 34 is an edge view of Fig. 33; Figs. 35 and 36 are side and edge views, respectively, of the plunger shown in Figs. 24 and 25.

Referring now more specifically to the drawing, the typewriter herein shown is of the ordinary construction and constitutes no part of my invention; consisting of a frame 40, letter keys designated as a whole as 41, and ten numeral keys, designated as a whole as 42, all of which, both numeral and letter keys, being mounted upon the ordinary rock bars 43. The typewriter is also provided with a carriage 44 and handle $44^a$ for shifting the same.

A suitable frame 45 is attached to the typewriter frame by means of two elbows 46, having a long horizontal section and vertical integral end pieces $45^a$ and $45^b$ constituting the entire frame upon which my mechanism is mounted. Rotatably mounted between the ends of the frame is the main drive-bar 47 upon which are rigidly mounted nine double ratchet wheels $48^a$, $48^b$, $48^c$, $48^d$, $48^e$, $48^f$, $48^g$, $48^h$ and $48^i$. Each double ratchet consists of a ratchet wheel 49 having its teeth oppositely disposed to the teeth of the smaller ratchet wheels 50. A guard-casing 51 is rigidly secured to the frame and extends over the smaller ratchet wheel 50. Each pair of ratchet wheels is provided with a guard-casing, which differ only in the position of the slot openings in the same, which will be hereinafter described. Metal straps 52 are pivotally mounted on the drive-bar 47 bearing against the guard-casing on one side and the larger ratchet wheel on the other side of each of the double ratchet mechanisms here described. Each guard-casing is provided with two slot openings 53 and 53$^a$, the latter openings, 53$^a$ being the outlets for the plungers 54 which are backed by springs 55, normally pressing the plungers 54 toward the larger ratchet wheels 49. In their normal position these plungers rest against the guard-casings 51, but when it is desired to move any pair of ratchet wheels a downward movement of the plunger, as viewed in Fig. 24, will cause the plunger to drop within the slot 53 and engage the ratchet wheel 49, and the lip 53$^b$ upon each plunger will travel beneath the inturned edge 53$^d$ of the guard-casing 51, which inturned edge 53$^d$ keeps the plunger 54 engaged to and drawing ratchet wheel 49 with it until it reaches the outlet slot opening 53$^a$, whereupon the plunger is thrown out of the outlet slot opening 53$^a$ by reason of the lip 53$^b$ of the plunger striking the cam surface 53$^c$, lifting the plunger, against the action of its spring 55, on top of the guard-casing thereby disengaging the plunger from the ratchet wheel.

A dog 56 having a head 56$^a$ and pawl 56$^b$, are arranged in a groove 56$^c$ on the side of the guard-casing shown in Fig. 29, with pawl 56$^b$ fitting slidably into slot 51$^a$ and extending over the smaller ratchet wheel 50, the head 56$^a$ being arranged adjacent the cam surface 53$^c$ and covering slot opening 53$^a$, so that when the lip 53$^b$ of plunger travels upon the cam surface it strikes the head 56$^a$, thereby moving the dog 56 transversely of the ratchet 50, which draws the pawl 56$^b$ into engagement with the teeth of the ratchet 50, thereby locking said ratchets against further movement since the dog cannot move relative to the guard-casing and the latter being secured to the frame 45. A spring 57 is secured to the guard-casing and bears against the dog 56 to normally hold the head 56$^a$ to cover slot opening 53$^a$ and the pawl 56$^b$ out of engagement with the teeth of the ratchet 50. When the plunger 54 enters the slot 53 and engages one of the teeth on the ratchet 49, movement of the strap ( ) circumferential of the drive-bar 47, causes the ratchet wheels to be rotated a certain distance, depending upon the distance between the slot openings 53 and 53$^a$ in each guard-casing, and by reference to Figs. 27 and 28 it will be noted that the openings 53 and 53$^a$ of Fig. 28 are considerably farther apart than in Fig. 27.

As nine guard-casings are provided for the nine pairs of ratchets and since Fig. 27 illustrates the guard-casing inclosing ratchet mechanism for operating numeral ring number 1, as hereinafter described, and Fig. 28 illustrates the guard-casing inclosing the ratchet mechanism for operating numeral ring number 9, it will be understood that the intermediate guard-casings between the end ratchet wheels are provided with similar slot openings 53 and 53$^a$, all of which differ only in that they are successively farther apart than the distance between the openings shown in Fig. 27. The purpose of varying the openings is to give the drive shaft 47 different degrees of rotation upon the operation of any pair of ratchet wheels and resulting in the rotation of the numeral rings (hereinafter described) to different extents.

Loosely mounted upon the drive shaft 47 at each end thereof, are gears 58 and 59 which are held in mesh with other gears (hereinafter described) at all times by washers 58$^a$ and 59$^a$ fixed on the drive shaft 47. The drive-shaft 47 is hollow and has two oppositely arranged slots 47$^a$ and 47$^b$ at each end. Inside of the drive-shaft 47 is slidably mounted a shifting rod 60; said shifting rod carries dogs 60$^a$ and 60$^b$ at each end thereof which shift in slots 47$^a$ and 47$^b$ but do not shift out of engagement of said slots, thereby prohibiting rotation of said shifting rod inside of drive-shaft 47. The ends of dogs 60$^a$ and 60$^b$ are adapted to enter between the teeth of gears 58 and 59 and being so arranged that when one dog is in engagement with one of the gears the other dog will be out of engagement. The purpose of these dogs is to reverse the rotation of the mechanism for adding or subtracting, as may be desired, and both dogs may be thrown out of engagement at the same time for the purpose of permitting the typewriter to be operated independent of the counting machine.

For operating the shifting-rod 60 I provide a ring 61 with two studs 61$^a$ on opposite sides of the ring, said ring 61 fitting loosely over one end of the shaft 60 and held in position by screw 61$^c$, allowing shaft 60 to rotate within said ring 61 but not to shift therein. Said studs 61$^a$ are adapted to enter slots 61$^b$ formed on opposite sides of the shifting lever, hereinafter described, as viewed in Figs. 2 and 17.

Mounted on the integral end piece 45$^a$ of the frame 45 is a shifting frame 62, with arm 62$^a$ at one end and face arm 62$^b$ at the other, said face arm 62$^b$ having a slot 62$^c$ with 3 notches 62$^d$, 62$^e$ and 62$^f$, indicating subtracting, disconnecting and adding, respectively. Within said slot 62$^c$ one end of lever 62ᵍ slides, the other end of the lever being pivoted to arm 62ᵃ, as shown in Fig. 17. The lower side of that portion of lever 62ᵍ sliding within slot 62ᶜ is beveled to a point fitting into notches 62ᵈ, 62ᵉ and 62ᶠ, thereby prohibiting independent shifting of shaft 60 during operation. Slot 62ᶜ is of a sufficient width to allow lever 62ᵍ to shift within it when not in engagement with one of the notches.

Mounted upon the upper ends of integral end pieces 45ᵃ and 45ᵇ is the numeral ring drive-shaft 63 having rigidly mounted gears 63ᵃ and 63ᵇ at each end thereof. Mounted on integral end piece 45ᵃ, between gear 63ᵃ of numeral ring shaft 63 and gear 58 of main drive-shaft 47, are two gears 64 and 64ᵃ, while mounted on integral end piece 45ᵇ, between gears 63ᵇ and 59 there is but one gear 65, all of which are in mesh, as shown in Figs. 1, 2 and 3. There is also mounted on end piece 45ᵃ a spring arm 66 having rollers 66ᵃ and 66ᵇ at each end thereof, as shown in Fig. 2, said rollers bearing against the teeth of gears 63ᵃ and 58 to prevent independent rotation of same.

A tubular guide surrounds the numeral ring drive-shaft 63, said guide being preferably hollow and formed in two sections 67 and 67ᵃ. A drive-wheel 68 is mounted upon the drive-shaft 63 and is provided with a lug 69, the purpose of which will be hereinafter explained. The drive-wheel 68 is preferably mounted between the inner ends of the two-part tube 67 and 67ᵃ and capable of rotating there-between. The tube is provided with longitudinal friction plates 71 and 71ᵃ arranged on same which normally extend out beyond the periphery of the tube. An opening 72 is formed in the tube 67 through which a portion of the star-wheels 73 project.

Figures 7, 8:
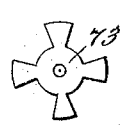
Figures 9, 10:
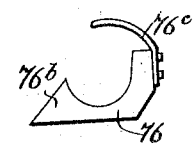
Figures 11, 12:
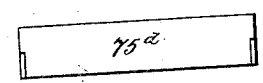
Figures 13, 14, 15:
Figure 16:
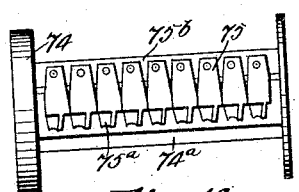

The mechanism will now be described for carrying the numeral rings, in the event of certain numeral-rings being added to beyond 9, or subtracted from below 0: A spool 74 is adapted to fit within the tube 67 and has a horizontal body portion 74ᵃ, crescent-shaped in cross-section as shown in Fig. 5, within the arc of which the numeral ring drive-shaft 63 is adapted to rotate. A plurality of four arm star wheels 73 are mounted upon the shaft 73ᵃ, said shaft being secured between the ends of the spool 74. There are preferably nine star-wheels, all of similar construction, independently mounted upon the shaft 73ᵃ, and adapted to rotate thereon, one arm of each star-wheel extending beyond the periphery of the tube 67. The outer faces of arms of each star-wheel are provided with grooves 73ᵇ and 73ᶜ, and shoulders 73ᵈ, 73ᵉ and 73ᶠ, as shown in Fig. 8. Arranged to the rear of the row of star-wheels are a series of movable stop-blocks 75, each having a curved and diagonal lip 75ᵃ adapted to engage the grooves 73ᵇ and 73ᶜ on the star-wheels. These stop-block lips 75ᵃ, in their normal positions, rest between the arms of star-wheels 73, with one end of lip covering the narrow end of groove 73ᵇ and the other end of same lip covering the narrow end of groove 73ᶜ of the next star-wheel arm, but these lips engage with said grooves until a star-wheel is rotated one way or the other. These stop-blocks 75 are each pivoted to a bar 75ᵇ fitting within the grooves 75ᶜ formed in the rear of each stop-block, said bar being secured between the ends of spool 74. Arranged behind the stop-blocks 75 is a spring finger 75ᵈ which is backed by springs 76ᶜ normally pressing the finger against the square shoulders of stop-blocks, and which is of a suitable length to engage all the stop-blocks to normally hold them in their central positions. A plurality of friction shoes 76 are pivoted on a pin 76ᵃ secured between the ends of the spool, a shoe being provided for each star-wheel and the end of each shoe being provided with a large face 76ᵇ normally pressing against and holding star-wheels in their proper positions by springs 76ᶜ, as shown in Fig. 5. Star-wheels 73, stop-blocks 75 and shoes 76 are all of the same width and in horizontal alinement.

The functions of the stop-blocks 75 are to prevent the star-wheels from being rotated more than a quarter of their circumference (which is equivalent to one space or 1/10 of the circumference of the numeral ring) at one time, and as there are four arms to each star-wheel and a star-wheel moves a quarter of its circumference in one operation it will be understood that as soon as one arm moves within the periphery of tubular-guide 67 the next following arm moves into its position. Upon rotation of one of the star-wheels (the means for rotating the same being hereinafter explained) either groove 73ᵇ or groove 73ᶜ will be engaged by the lip 75ᵃ of stop-block 75, depending upon which direction the star-wheel is rotated, as follows:

Since the lips 75ᵃ of stop-blocks are diagonal and the stop-blocks are pivoted (the star-wheels not being movable laterally) the downward rotation (subtracting) of star-wheel will cause the lip 75ᵃ to go through groove 73ᶜ of star-wheel, bearing against shoulder 73ᵈ with its diagonal surface and being forced to shift to the left, thereby coming in line and by further rotation of star-wheel, coming in contact with the wide end of shoulder 73ᵉ of the next following arm of star-wheel, thereby stopping further rotation of star-wheel and at the same time disengaging itself from groove 73ᶜ of arm of star-wheel just passed, when it will be returned to its normal central position by spring-finger 75ᵈ.

The upward rotation (adding) of star-wheel will cause the lip 75ᵃ to go through groove 73ᵇ of star-wheel arm, bearing against shoulder 73ᵈ with its diagonal surface and being forced to shift to the right (instead of to the left as in the downward rotation of star-wheel) thereby coming in line, and by further rotation of star-wheel, coming in contact with the side end of shoulder 73ᶜ of the next following arm of star-wheel, thereby stopping further rotation of star-wheel and at the same time dis-engaging itself from groove 73ᵇ of the arm of star-wheel just passed and thus will be returned to its normal central position by spring-finger 75ᵈ.

The function of the shoe 76 is to prevent independent rotation of the individual star-wheels.

The numeral mechanism will now be described: A casing 77 is provided with end-plates 77ᵃ, said end places being formed with a plurality of oppositely arranged grooves 77ᵇ for the purpose of allowing said casing 77 to shift over lug 69 of drive-wheel 68 and friction-bars 71 and 71ᵃ. The casing 77 is also provided with a longitudinal slot 77ᶜ, through which the numeral rings, hereinafter described, may be viewed. Within the casing 77 are a plurality of numeral-carrying rings 78 which are provided with a series of ten internal teeth 79 and 79ᵃ, spaced in relative arrangement with the teeth formed by grooves 77ᵇ in the end plates 77ᵃ. Nine of these numeral ring teeth 79 are substantially one-half the width of the ring 78, and one tooth 79ᵃ is substantially twice the width of the teeth 79, in other words, as wide as the ring 78. This full-width tooth 79ᵃ is arranged between the numerals 9 and 0, it being understood that the tooth is in the inside of ring while the numerals are on the outside. There are preferably ten numeral-rings 78, all of which are the same and on the circumference of which are arranged the digits 1, 2, 3, 4, 5, 6, 7, 8, 9 and 0. However, in the case of calculating in dollars and cents the casing 77 would have to contain a decimal ring, identically the same as a numeral ring with the exception that its circumference would carry ten decimal points instead of numerals, said decimal-ring being rigidly attached to numeral-ring in the tens column and would occupy the same position between the numeral-rings as the decimal point does between dollars and cents.

The end plates 77ᵃ of casing 77 and the numeral rings are so designed that their inner peripheries will slide upon the exterior surface of the tubes 67 and 67ᵃ, and the purpose of the bars 71 and 71ᵃ (which fit slidably into grooves 77ᵇ of end plates and grooves between the teeth of numeral rings) is to prevent the casing 77 and the inclosed rings from turning relative to the tubular guides 67 and 67ᵃ, although it must be understood that the bars 71 and 71ᵃ terminate short of the center of the tubular guides, leaving a margin in which the numeral rings are free to rotate when driven without interference by the bars 71 and 71ᵃ.

Fig. 4 shows the relative positions of the numeral-rings 78 (in cross-section on the line E—F of Fig. 5) to star-wheels when in position for operation, numeral-ring 78ᵃ being at point of operation. The left half of drive-wheel 68, carrying lug 69, is in line and in engagement with the right half of numeral-ring 78ᵃ carrying an unbroken line of teeth, viz: the nine half-width teeth 79 and the right half of the full-width tooth 79ᵃ, and the left half of the same numeral-ring, carrying only one tooth, (being the left half of the full-width tooth 79ᵃ) is in line with the right half of star-wheel (a) but does not come in engagement with said star-wheel until a numeral-ring has been rotated 9 spaces and shows the numeral 9 in slot opening of casing 77, assuming that before this operation it showed the numeral 0 and the operation is adding. The left half of star-wheel (a) is in line and engagement with the right half of numeral ring 78ᵇ, and the left half of numeral ring 78ᵇ is in line, but not in engagement, with the right half of star-wheel (b). The left half of star-wheel (b) is in line and engagement with the right half of decimal-ring 78ᶜ, and the left half of decimal-ring 78ᶜ is in line, but not in engagement, with the right half of star-wheel (c). In short, the right halves of all the numeral-rings and the right half of the decimal-ring, in their normal positions, are in line and engagement with the left halves of the star-wheels and the left half of the drive-wheel and are propelled by same; the engagement being caused by the left halves of arms of star-wheels being between the teeth of numeral and decimal rings, and the lug 69 on the left half of drive-wheel being between the teeth of the same rings when said rings are in line with it. The left halves of all numeral and decimal rings (carrying but one tooth each, that being the left half of full-width tooth 79ᵃ) in their normal positions, are in line with the right halves of star-wheels and come in engagement and propel same when the numerals 9 or 0 appear in slot opening of casing. In other words, when drive-wheel revolves the numeral-ring in engagement with it ten spaces (one complete revolution) the left half of the same numeral-ring engages the right half of arm of star-wheel and draws it along a distance equivalent to one space; the left half of the same arm of star-wheel being in engagement with the unbroken line of teeth (right half of numeral ring) of an adjacent numeral-ring it draws the adjacent numeral-ring along with it one space, when said arm of star-wheel moves with the periphery of tubular guide and out of engagement of numeral-ring.

From the above it will be noted that the star-wheels and drive-wheel perform the same functions, with the exception that the drive-wheel can rotate a numeral ring 1, 2, 3, 4, 5, 6, 7, 8 or 9 spaces, as desired, in one operation and is propelled by drive-shaft 63, while a star-wheel can rotate a numeral-ring just one space in one operation and is propelled by the left half of an adjacent numeral-ring by means of the single tooth 79$^a$. Furthermore, lug 69 of drive-wheel has ten normal positions on the circumferential periphery of tubular guide 67, in other words, lug 69 may be in alinement with any one of the ten grooves between the teeth of numeral-ring, as shown in Fig. 5, while the arms of star-wheels have but one normal position on the circumferential periphery of said tubular-guide 67, as shown in Fig. 5. The teeth of casing 77 in their normal positions, are never in line or engagement with lug 69 of drive-wheel, being either on one side of it or the other.

The fastening of decimal-ring 78$^c$ to numeral ring causes two star-wheels to move as one, which has no effect on the result, because when decimal-ring is in line and engagement with lug 69 the decimal point (period) typewriter key is struck which does not put drive-wheel in operation, as the decimal point typewriter key is not connected to main drive-bar. However, upon releasing said decimal point typewriter key casing 77 shifts one space to the left (one space being equivalent to width of numeral-rings).

Star-wheels 73, stop-blocks 75, shoes 76 and numeral-rings 78 are all of the same width, said width being equivalent to the distance typewriter carriage shifts from right to left by one stroke of typewriter key, therefore, it will be understood that each shift of the casing 77 shifts the numeral-rings, one after the other, in line and engagement with lug 69 of drive-wheel 68.

No special care need be taken in the striking of the typewriter keys by reason of this counting device being attached, and it is not necessary to follow the key with the finger to its limit of depression, as plunger 54 cannot be thrown out of engagement with ratchet wheel 49 before the proper time by any manner of stroke, by reason of the inturned edge 53$^d$ of guard-casing locking plunger to engagement with ratchet wheel until outlet slot 53$^a$ is reached.

From the above it will be noted that the device is in its normal position both at the beginning of stroke and at the end of stroke, with the exception of strap 52 attached to typewriter key, which, being attached to typewriter key returns to its normal position at the same time with said key, while all the other parts are in their normal positions when depression of key is finished, therefore, there is no danger of one part overtaking another no matter how fast it is operated.

This device can be attached to both a single or double shift typewriter, all that is necessary to adapt it from one to the other is to reset the numeral ring casing 77 to the bar 83.

By shifting the lever 62$^g$ to the right the dog 60$^a$ will engage the teeth of the gear 58 and upon the operation of the machine the numeral ring shaft 63 will be rotated in one direction for adding. By shifting the lever 62$^g$ to the left, as viewed in Fig. 17, the dog 60$^b$ will be thrown into engagement with the gear 59 so that upon the operation of the machine the rotation of the drive-shaft 63 will be in the opposite direction from its rotation through the gear 58. By throwing both dogs out of engagement the typewriter alone may be operated, as the main drive shaft 47, if the numeral keys of the typewriter are struck, will then rotate without rotating gears 58 and 59.

The typewriter rock-bars 43, bearing numeral typewriter keys 1, 2, 3, 4, 5, 6, 7, 8 and 9 are connected to the metal straps 52 by means of links 82, the upper ends of which are forked and engage studs 82$^a$ upon opposite sides of the straps. The casing 77 is connected to the scale bar 83 of the typewriter by buckles 77$^d$ and is movable therewith along the tubular guide 67, these buckles being so arranged as to have play backward and forward, but not from left to right, thereby eliminating bearing of casing 77 on the tubular guide 67.

The operation of the device is as follows: When it is desired to add, the lever 62$^g$ is shifted to the right so as to bring the dog 60$^a$ into engagement with the gear 58. Assuming that it is desired to add the two sums of 1000.09 and 6576.36, the carriage of the typewriter (carrying scale bar 83, which in turn carries the casing 77 containing numeral rings) would be shifted along in the ordinary way, moving the casing 77 along the tube 67 until the numeral ring designating thousands is in position to be engaged by the lug 69 on the drive-wheel 68. The thousands numeral-ring is the seventh one from the right hand side of the casing 77, as viewed in Fig. 1, and upon which appears the numeral 1. The numeral typewriter key 42$^a$ (being the numeral 6) is then struck drawing the link bar 82 downward, which in turn pulls the strap casing 52, whereupon the lip 53$^b$ of plunger 54 drops down the cam surface of slot opening 53 of guard-casing causing plunger 54 to engage ratchet 49, thereby rocking the shaft 47, which, through the medium of the gears 58, 64ª, 64 and 63ª, rotates the numeral ring drive-shaft 63 carrying the drive-wheel 68, as shown in Figs. 1 and 2.

The lug 69, on the drive-wheel 68, being engaged to teeth of the numeral ring in line with it, in this case being the ring in the thousands column and showing the numeral 1, rotates said numeral ring six spaces, which will bring the numeral 7 thereon within the slot opening in casing 77. When the plunger has engaged the ratchet wheel 49 and said ratchet has been moved a sufficient distance to present the proper numeral in the slot opening 77ᶜ of casing 77 the lip 53ᵇ of plunger will then have reached the cam surface 53ᶜ of guard casing and the moving of said lip on this cam surface will cause the plunger to be withdrawn from the teeth of ratchet wheel, against the action of the spring 55, thereby raising the head 56ª of dog 56, against the action of spring 57, as shown in Fig. 29, and pulling the pawl 56ᵇ at the other end of said dog 56 between the teeth of the smaller ratchet wheel 50 and stopping its further rotation, said pawl being held between the teeth of ratchet 50 until lip 53ᵇ of plunger passes (in its downward movement) the head 56ª of dog 56, thereby smothering rebound. As soon as lip 53ᵇ of plunger passes head 56ª the dog 56 is released and will be pulled back to its normal position by spring 57, with head 56ª again covering slot 53ª in guard-casing 51 and pawl 56ᵇ in its position disengaged from teeth of ratchet 50. The beveled surface of head 56ª will then allow lip 53ᵇ of plunger (on the return movement of strap 52 to its normal position) to reach the outside of inturned edge 53ᵈ upon which it slides until it reaches its normal position. The same means which returns the typewriter numeral key to its proper position after being struck re-sets the strap 52 bearing plunger 54 for another operation. Upon the numeral typewriter key 42ª being released the casing 77 is shifted to the left the width of one numeral ring by the carriage of typewriter, as viewed in Fig. 1, by the normal operation of the typewriter, thereby bringing the sixth numeral ring from the right of the casing, showing the numeral 0 in alinement with the drive-wheel 68, and by striking the numeral typewriter key 5, designated as 42ᵇ, the numeral 5 will appear adjacent the numeral 7 and to the right thereof, as shown in Fig. 1. Upon typewriter key 42ᵇ being released, the casing 77 is shifted another space to the left, and by striking the typewriter key 7, designated as 42ᶜ, the numeral 7 appears on the fifth numeral ring. Upon typewriter key 42ᶜ being released, casing 77 is again shifted to the left and by again striking the numeral typewriter key 42ª the numeral 6 appears upon the fourth numeral ring from the right. Upon release of typewriter key 42ª the casing 77 is again shifted to the left bringing in alinement with the drive-wheel 68 the third ring, which is the decimal ring and which is rigidly connected to second numeral ring from the right, whereupon the letter typewriter key (period), designated as 41ª (which is not linked to counter device and does not move the drive-wheel 68) is struck. Upon release of letter key 41ª the casing 77 is again shifted to the left bringing the second numeral ring in line with the drive-wheel, whereupon by striking the numeral typewriter key 3, designated as 42ᵈ, the numeral 3 appears on the second numeral ring from the right. Upon release of typewriter key 42ᵈ casing 77 again shifts to the left bringing the first numeral ring from the right side of casing 77 (upon which appears the numeral 9) in alinement with drive-wheel 68, and as the full-width tooth 79ª is between the numerals 9 and 0, and the numeral 9 appears in slot opening, left half of said full-width tooth 79ª is in engagement with the right half o fstar-wheel, the left half of same star-wheel being in engagement with the right half of the numeral ring on which operation was just completed and upon which the numeral 3 appears through slot-opening; whereupon, by striking the numeral typewriter key 6, designated as 42ª, the numerals appearing in order will be 0 instead of 9 on the numeral ring in engagement with drive-wheel, and 4 instead of 3 on the second numeral ring, then 1, 2, 3, 4 and 5 will appear on the numeral-ring in engagement with the drive-wheel, completing the operation. All of which makes the total 7576.45 as shown in Fig. 1.

The returning of the numeral rings to zero and writing the total on the sheet in typewriter (the individual series of numbers having been written on the sheet at the same time they were taken up by the numeral rings in casing 77) is accomplished in one operation, viz.: By shifting the lever 62ᵉ to the extreme left, thereby setting the device for subtracting, and by writing the total shown in casing 77 on sheet the same amount will be subtracted from numeral rings, leaving all numeral rings set at zero.

The subtracting of one number or a series of numbers, from another number or series of numbers is accomplished by the same operation of the mechanism just described, except that the lever 62ᵉ is shifted to the left, thereby throwing the dog 60ª out of engagement with the gear 58 and the dog 60ᵇ into engagement with the gear 59. When the mechanism is in this shifted position the rotation of numeral ring drive-shaft 63 will be in the reverse direction from that when the lever 62ᵉ was shifted to the extreme right with dog 60ª in engagement with gear 58. The operation would be as follows:

If it was desired to subtract 1000.09 from 7576.45 the typewriter carriage would be shifted in the ordinary way until the casing 77 would be relative to the drive-wheel 68 so as to bring the seventh numeral-ring, showing the numeral 7, in line with said drive-wheel. The numeral typewriter key 1, designated as 42ᶠ, would then be struck turning the numeral ring showing 7 one space lower and bringing the numeral 6 into view. Upon the release of typewriter key 42ᶠ the casing 77 would shift the width of one numeral ring to the left, as in the case of adding, bringing the sixth numeral ring (showing the numeral 5) in line with the drive-wheel. The numeral typewriter key 0, designated as 42ˢ would then be struck and released which would cause casing 77 to shift one space to the left, without having moved drive-wheel 68, as typewriter key 0, designated as 42ˢ, is not in any way connected to my device. The drive-wheel 68 is now in engagement with the fifth numeral ring (showing the numeral 7) and as there are two more 0's, one decimal point and another 0 before we come to the numeral 9 of 1000.09, typewriter key 42ˢ will be struck twice, decimal point (period) typewriter key 41ᵃ will be struck once and typewriter key 42ˢ will be struck again, all of which shifts the casing 77 four spaces bringing the last numeral ring (showing the numeral 5) in line with drive-wheel 68. Upon striking numeral-typewriter key 9 (designated as 42ᵉ) the following numerals will be brought successively in view: 4, 3, 2, 1, 0 (in this position the full-width tooth 79ᵃ on the left half of this numeral-ring is in engagement with the right half of arm of star-wheel; the left half of same arm being in engagement with the numeral-ring upon which operation was just completed, showing the numeral 4) then 9, 8, 7 and 6. The moving from 0 to 9 caused the full-width tooth 79ᵃ to engage and rotate arm of star-wheel one space, and as the left half of this arm was in engagement with the adjacent numeral ring to the left it pulled same with it one space, thereby showing 3 instead of 4 on the second numeral ring, thus obtaining the remainder 6576.36. These illustrations as to the addition and subtraction of certain numbers will serve to illustrate the principle of operation for all numbers.

In case the wrong key is struck, as 5 instead of 4, the device will have to be placed at subtraction in the case of addition, and to addition if the operation is subtraction, and the wrong amount subtracted or added as the case may be, then the wrong amount erased from the paper and operation repeated, striking the desired key.

Having now described my invention,—I claim:

1. The combination with a typewriter having numeral keys and a laterally shifting member, of a casing connected to said laterally shifting member and having an opening therein, a series of numeral rings rotatably mounted in said casing provided with internal lugs, a tubular support upon which said numeral rings and casing are slidably mounted, a drive-shaft in said support, a drive-wheel on said shaft adapted to engage one of the lugs on any one of said numeral rings for rotating one of said rings, a series of arm wheels mounted within said tubular support and the peripheries of which extend beyond the periphery of said support and between adjacent lugs on said numeral rings, means for locking the numeral rings not driven by said drive-wheel and means for actuating said drive-wheel.

2. The combination with a typewriter having numeral keys and a laterally shifting member, of a casing having an opening therein and connected to said laterally shifting member, a series of numeral rings rotatably mounted in said casing and having internal lugs, a support upon which said casing and numeral rings are slidably mounted, a drive-shaft, a drive-wheel adapted to engage a lug on any one of said numeral rings, a series of arm wheels rotatably mounted within said tubular support and the ends of which arms extend beyond the periphery of said support and between adjacent lugs on said numeral rings, a single lug on each of said numeral rings adapted to engage one of the arms of said wheels at pre-determined times, means for locking the arm wheels not driven, means for locking a driven arm wheel against rotation more than a quarter of its circumference at one time, means for locking said numeral rings not driven by said drive-wheel and means for actuating said drive-wheel.

3. The combination with a typewriter having numeral keys and a laterally shifting member, of a casing having an opening therein and connected to said laterally shifting member, a series of numeral rings rotatably mounted in said casing and having internal lugs, a support upon which said casing and numeral rings are slidably mounted, a drive-shaft, a drive-wheel adapted to engage a lug on any one of said numeral rings, means for actuating said drive-shaft, a drive-bar, means for actuating said drive-bar and for imparting rotating movements of different extents thereto comprising a series of ratchet wheels rigidly mounted thereon, a series of levers pivotally mounted on said drive bar, means on each lever for engaging its complementary ratchet wheel, means for disengaging said engaging means at pre-determined extents of movement of said levers, driving means between said drive-shaft and drive-bar and means connecting said levers with the numeral keys of the typewriter.

4. The combination with a typewriter having numeral keys and a laterally shifting member, of a casing having an opening therein and connected to said laterally shifting member, a series of numeral rings rotatably mounted in said casing and having internal lugs, a tubular support upon which said numeral rings and casing are slidably mounted, means for preventing the rotation of said casing relative to said tubular support, a drive-shaft in said support, a drive-wheel on said shaft adapted to engage one of the lugs on any one of said numeral rings for rotating one of said rings, a series of arm wheels mounted within said tubular support and the arms of which extend beyond the periphery of said support and between adjacent lugs on said numeral rings, means for locking said numeral rings not driven by said drive-wheel, means for actuating said drive-wheel, and means for rotating said drive-shaft in either direction.

5. The combination with a typewriter having numeral keys and a laterally shifting member, of a casing having an opening therein and connected to said laterally shifting member, a series of numeral rings rotatably mounted in said casing and having internal lugs, a tubular support on which said numeral rings and casing are slidably mounted, a drive-shaft in said support, a drive-wheel on said shaft adapted to engage one of the lugs on any one of said numeral rings for rotating one of said rings, a series of arm wheels mounted within said tubular support and the arms of which extend beyond the periphery of said support, means for locking said numeral rings not driven by said drive-wheel, means for actuating said drive-wheel, means for preventing the rotation of said casing relative to said tubular support, a gear at each end of said drive-shaft, a gear at each end of said drive-bar, a single intermediate gear between the two end gears at one end, two intermediate gears between the end gears at the other end, and means for engaging either end gear on said drive-bar to impart opposite rotating movements to said drive-shaft.

6. The combination with a typewriter having numeral keys and a laterally shifting member, of a counter comprising a casing having an opening therein, a series of numeral rings rotatably mounted in said casing and having internal lugs, a support upon which said casing and numeral rings are slidably mounted, a drive-shaft, a drive-wheel adapted to engage a lug on any one of said numeral rings, means for actuating said drive-shaft, a drive-bar, means for actuating said drive-bar and for imparting rotating movements of different extents thereto comprising a series of ratchet wheels rigidly mounted thereon, a series of levers pivotally mounted on said drive-bar, means on each lever for engaging its complementary ratchet-wheel, means for disengaging said engaging means at predetermined extents of movement of said levers, driving means between said drive-shaft and drive-bar and connecting means between said levers and the numeral keys of said typewriter and between said casing and a laterally shifting member of said typewriter.

WILLIAM FUHR.

Witnesses:
 JAMES R. OFFIELD,
 SADIE M. RYAN.

Copies of this patent may be obtained for five cents each, by addressing the "Commissioner of Patents, Washington, D. C."